United States Patent
Kariya et al.

(10) Patent No.: US 7,614,219 B2
(45) Date of Patent: Nov. 10, 2009

(54) EXHAUST GAS PURIFYING APPARATUS FOR INTERNAL COMBUSTION ENGINE

(75) Inventors: Yasuhiro Kariya, Obu (JP); Shigeto Yahata, Obu (JP); Tsukasa Kuboshima, Okazaki (JP); Masumi Kinugawa, Okazaki (JP); Kanehito Nakamura, Ichinomiya (JP)

(73) Assignee: Denso Corporation, Kariya (JP)

( * ) Notice: Subject to any disclaimer, the term of this patent is extended or adjusted under 35 U.S.C. 154(b) by 340 days.

(21) Appl. No.: 11/514,146

(22) Filed: Sep. 1, 2006

(65) Prior Publication Data

US 2007/0044459 A1 Mar. 1, 2007

(30) Foreign Application Priority Data

Sep. 1, 2005 (JP) ............................. 2005-253563

(51) Int. Cl.
*F01N 3/025* (2006.01)
(52) U.S. Cl. .......................................... 60/295; 60/297
(58) Field of Classification Search .................. 60/285, 60/297, 311, 277, 295
See application file for complete search history.

(56) References Cited

U.S. PATENT DOCUMENTS

| 5,319,930 | A  | * | 6/1994  | Shinzawa et al. .............. 60/286 |
| 6,758,039 | B2 | * | 7/2004  | Kuboshima et al. ........... 60/311 |
| 6,907,873 | B2 |   | 6/2005  | Hamahata |
| 6,962,046 | B2 | * | 11/2005 | Kuboshima et al. ........... 60/295 |
| 6,983,591 | B2 | * | 1/2006  | Kondo et al. ................... 60/295 |
| 7,272,926 | B2 | * | 9/2007  | Kosaka ......................... 60/295 |
| 2004/0159099 | A1 | * | 8/2004 | Kuboshima et al. ........... 60/297 |
| 2005/0016137 | A1 | * | 1/2005 | Hamahata et al. .............. 55/283 |
| 2005/0137776 | A1 | * | 6/2005 | Gioannini et al. ........... 701/101 |
| 2005/0223701 | A1 |   | 10/2005 | Sato et al. |

* cited by examiner

*Primary Examiner*—Thomas E Denion
*Assistant Examiner*—Jonathan Matthias
(74) *Attorney, Agent, or Firm*—Nixon & Vanderhye P.C.

(57) ABSTRACT

An exhaust gas purifying apparatus for an internal combustion engine includes a collector, which collects exhaust particles in exhaust gas. The apparatus computes a pressure-difference-based measured value of a collected amount of the particles based on a pressure difference, and computes a pressure-difference-based estimated value by correcting the measured value. The apparatus computes an operational-state-based estimated value of the collected amount. The apparatus regenerates the collector by burning the exhaust particles when one of the pressure-difference-based estimated value and the operational-state-based estimated value reaches a predetermined value. The apparatus computes a current pressure-difference-based estimated value by correcting a current pressure-difference-based measured value based on information related to an immediately preceding operational-state-based computing period such that the current pressure-difference-based estimated value ranges from the current measured value to a previous pressure-difference-based estimated value.

15 Claims, 4 Drawing Sheets

EXHAUST GAS PURIFYING APPARATUS FOR INTERNAL COMBUSTION ENGINE

CROSS REFERENCE TO RELATED APPLICATION

This application is based on and incorporates herein by reference Japanese Patent Application No. 2005-253563 filed on Sep. 1, 2005.

BACKGROUND OF THE INVENTION

1. Field of the Invention

The present invention relates to an exhaust gas purifying apparatus, which includes a collector that collects particles in exhaust gas (exhaust particles) of an internal combustion engine.

2. Description of Related Art

Recently, in a diesel internal combustion engine mounted on a vehicle, a collector that collects exhaust particles is provided in a middle of an exhaust pipe in order to reduce the exhaust particles in exhaust gas.

The collector is generally a ceramic porous media that includes multiple exhaust gas passages. The collector adsorbs and collects the exhaust particles when the exhaust gas passes through porous partitions that define the exhaust gas passages. When the collected exhaust particles, which are collected by the collector, remains in the collector, a pressure loss is increased so that an efficiency of the engine may be degraded. Thus, the collector needs to be regenerated by burning (oxidizing) the exhaust particles in the collector when a computed value of a collected amount reaches a predetermined value.

Specifically, the collector carries an oxidation catalytic converter. At a time of the regeneration of the collector, after a main inaction, a post injection is made to supply a hydrocarbon (HC) into the collector such that an interior of the collector is heated due to a catalytic reaction of the HC and the exhaust particles collected in the collector are burned and removed.

Estimation method for estimating a collected amount of the exhaust particles in the collector includes a pressure-difference-based estimation method and an operational-state-based (operational-history-based) estimation method. In the pressure-difference-based estimation method, the collected amount is estimated based on a pressure difference across the collector. In the operational-state-based estimation method, the collected amount is estimated by integrating an increase of the collected amount. Here, the increase is computed based on a discharge amount of the exhaust particles from the internal combustion engine. Further, there is disclosed another method, in which the pressure-difference-based estimation method and the operational-state-based estimation method are combined. In this method, a correction coefficient is computed based on the increase of the collected amount computed through the pressure-difference-based estimation method and based on the increase computed through the operational-state-based estimation method. Then, an estimated value of the collected amount, which is estimated through the operational-state-based estimation method, is corrected based on the correction coefficient (see e.g., Japanese Unexamined Patent Publication No. 2004-76589, corresponding to U.S. Pat. No. 6,907,873).

In the above pressure-difference-based estimation method, the collected amount can be highly accurately estimated in a state where a flow rate of the exhaust gas is substantially high and an operational state of the internal combustion engine is reliably stable. However, in a transient operational state, such as an acceleration or deceleration state, where the pressure difference and the flow rate of the exhaust gas are transiently changing, the collected amount cannot be substantially accurately estimated. Also, when the flow rate of the exhaust gas is low, the pressure difference becomes small, resulting in that the collected amount cannot be substantially accurately estimated.

In a case where the degree of accuracy in estimation by the pressure-difference-based estimation method needs to be exclusively improved, the pressure-difference-based estimation method can be applied only when the operational state is substantially stable and the flow rate of the exhaust gas is substantially high. However, in this case, the pressure-difference-based estimation method is used only in a limited opportunity. Thus, the pressure-difference-based estimation method, which can highly accurately estimates the collected amount, is less often used to estimate. Therefore, even in a case of a semi-steady operational state, where the flow rate of the exhaust gas and the operational state are changing to some extent, the collected amount needs to be estimated by the pressure-difference-based estimation method in order to frequently use the pressure-difference-based estimation method for estimation.

In the semi-steady operational state, the degree of accuracy in estimation by the pressure-difference-based estimation method may be degraded. However, in an apparatus disclosed in Japanese Unexamined Patent Publication No. 2004-76589, the collected amount computed by the pressure-difference-based estimation method is not corrected. Therefore, under a state (e.g., the semi-steady operational state) where the degree of accuracy in estimation by the pressure-difference-based estimation method is degraded proper timing for the regeneration of the collector may be missed in a worst case scenario, and this may lead to a failure of the collector so that a function may be severely damaged.

The collected amount is computed as follows in a known apparatus for estimating the collected amount by switching the pressure-difference-based estimation method and the operational-state-based estimation method in accordance with the operational state. When the operational state is switched from the pressure-difference-based estimation method to the operational-state-based estimation method, the increase of the collected amount, which is estimated based on the operational state of the internal combustion engine, is added to a base estimated value, which is a current estimated value of the collected amount estimated through the pressure-difference-based estimation method. In this case, if the base estimated value of the collected amount is computed during the semi-steady operational state, the degree of the accuracy in estimating the collected amount by the operational-state-based estimation method may be degraded because the degree of the accuracy of the base estimated value of the collected amount itself is low.

SUMMARY OF THE INVENTION

The present invention is made in view of the above disadvantages. Thus, it is an objective of the present invention to address at least one of the above disadvantages.

To achieve the objective of the present invention, there is provided an exhaust gas purifying apparatus for an internal combustion engine, which is mounted on a vehicle, the exhaust gas purifying apparatus including a collector, a pressure-difference-based computing means, and an operational-state-based computing means. The collector collects exhaust particles in exhaust gas discharged from the internal combustion engine. The pressure-difference-based computing means computes a pressure-difference-based measured value of a collected amount of the exhaust particles in the collector based on a pressure difference across the collector, and computes a pressure-difference-based estimated value of the collected amount by correcting the pressure-difference-based measured value of the collected amount. The operational-state-based computing means computes an operational-state-based increase of the collected amount of the exhaust particles in the collector based on an operational state of the internal combustion engine, and computes an operational-state-based estimated value of the collected amount by adding the operational-state-based increase of the collected amount to the pressure-difference-based estimated value of the collected amount computed latest by the pressure-difference-based computing means. The exhaust gas purifying apparatus switches the pressure-difference-based computing means and the operational-state-based computing means based on a predetermined operational condition. The exhaust gas purifying apparatus regenerates the collector by burning the exhaust particles collected in the collector when one of the pressure-difference-based estimated value of the collected amount and the operational-state-based estimated value of the collected amount reaches a predetermined value. The pressure-difference-based computing means computes a current pressure-difference-based estimated value by correcting a current pressure-difference-based measured value of the collected amount based on information related to an immediately preceding operational-state-based computing period, where the operational-state-based computing means computes the collected amount, such that the current pressure-difference-based estimated value ranges from the current pressure-difference-based measured value to a previous pressure-difference-based estimated value, which is computed previously of the current pressure-difference-based estimated value.

To achieve the objective of the present invention, there is also provided an exhaust gas purifying apparatus for an internal combustion engine, which is mounted on a vehicle, the exhaust gas purifying apparatus including a collector, a pressure-difference-based computing means, and an operational-state-based computing means. The collector collects exhaust particles in exhaust gas discharged from the internal combustion engine. The pressure-difference-based computing means computes a pressure-difference-based measured value of a collected amount of the exhaust particles in the collector based on a pressure difference across the collector, and computes a pressure-difference-based estimated value of the collected amount by correcting the pressure-difference-based measured value of the collected amount. The operational-state-based computing means computes an operational-state-based increase of the collected amount of the exhaust particles in the collector based on an operational state of the internal combustion engine, and computes an operational-state-based estimated value of the collected amount by adding the operational-state-based increase of the collected amount to the pressure-difference-based estimated value of the collected amount computed latest by the pressure-difference-based computing means. The exhaust gas purifying apparatus switches the pressure-difference-based computing means and the operational-state-based computing means based on a predetermined operational condition. The exhaust gas purifying apparatus regenerates the collector by burning the exhaust particles collected in the collector when one of the pressure-difference-based estimated value of the collected amount and the operational-state-based estimated value of the collected amount reaches a predetermined value. The pressure-difference-based computing means computes a current pressure-difference-based estimated value by correcting a current pressure-difference-based measured value of the collected amount based on a flow rate of the exhaust gas that passes through the collector such that the current pressure-difference-based estimated value ranges from the current pressure-difference-based measured value to a previous pressure-difference-based estimated value, which is computed previously of the current pressure-difference-based estimated value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

A first embodiment of the present invention will be described with accompanying drawings.

Figure 1:
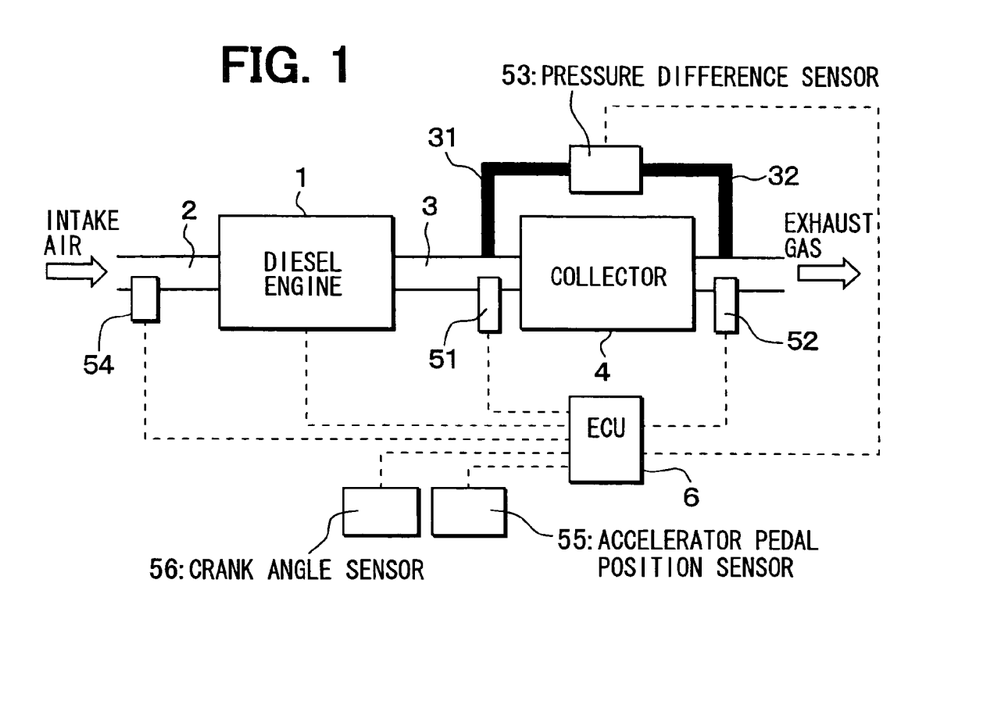
FIG. 1 is a general schematic diagram of an exhaust gas purifying apparatus for an internal combustion engine according to a first embodiment of the present invention.

As shown in FIG. 1, an intake passage 2 and an exhaust passage 3 are connected to a diesel engine (hereinafter referred as an internal combustion engine) 1. The internal combustion engine 1 serves as a power source of a vehicle travel. Intake air passes through the intake passage 2 and exhaust gas discharged from the internal combustion engine 1 passes through the exhaust passage 3. A collector 4 that collects (removes) exhaust particles is provided in a middle of the exhaust passage 3.

The collector 4 includes a filter body, which is formed by sealing passages in a porous ceramic honeycomb body. The porous ceramic honeycomb body is made of a material, such as cordierite, silicon carbide. The exhaust particles are collected and deposit on a surface of the filter body. Also, an oxidation catalyst is carried by the surface of the filter body of the collector 4 such that the exhaust particles are oxidized and burned to be removed under a predetermined temperature condition. The oxidation catalyst mainly includes a noble metal, such as platinum, palladium.

A first temperature sensor 51 is provided immediately upstream of the collector 4 in the exhaust passage 3 to sense a temperature (a DPF inlet temperature) of the exhaust gas that flows into the collector 4. Also, a second temperature sensor 52 is provided immediately downstream of the collector 4 in the exhaust passage 3 to sense a temperature (a DPF outlet temperature) of the exhaust gas that outflows from the collector 4.

A first branch passage 31 branches off the exhaust passage 3 immediately upstream of the collector 4, and a second branch passage 32 branches off the exhaust passage 3 immediately downstream of the collector 4. A pressure difference sensor 53 is located between the first and second branch passages 31, 32 to sense a pressure difference (a cross pressure difference) between an inlet side and outlet side of the collector 4.

Figure 2:
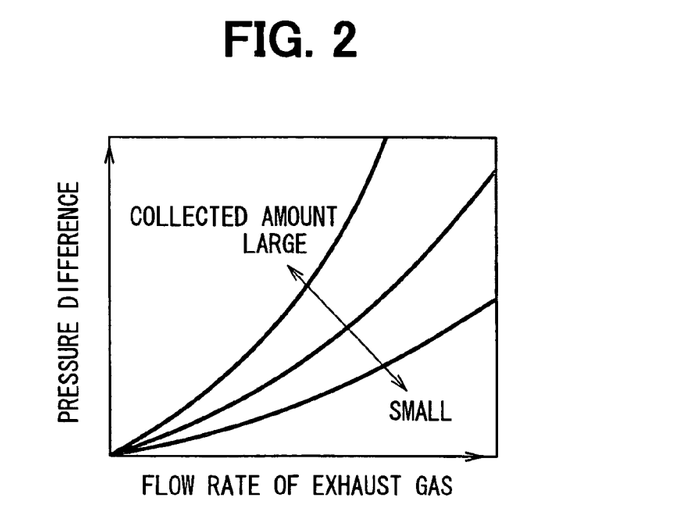
FIG. 2 is a diagram showing a pressure difference across a collector in relation to a flow rate of exhaust gas and a collected amount of exhaust particles.
Figure 4:
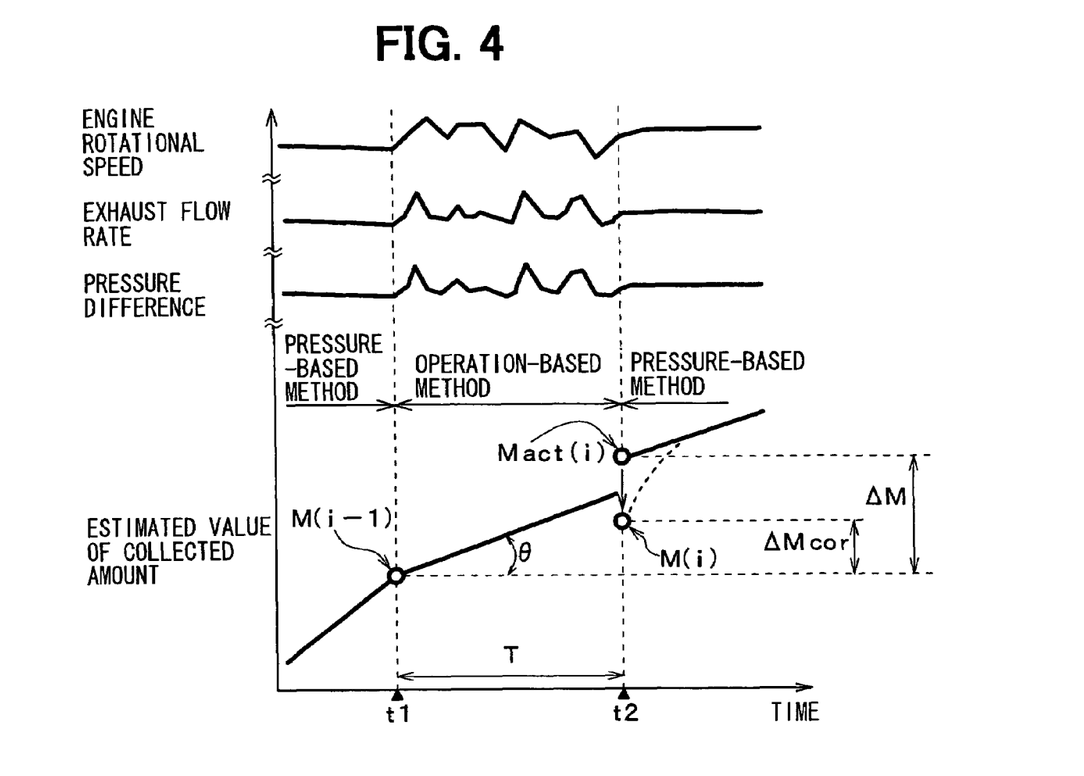
FIG. 4 is a time chart showing an execution example of the collector regeneration control.

FIG. 2 shows the cross pressure difference in relation to the flow rate of the exhaust gas, which passes through the collector 4, and a collected amount of exhaust particles in the collector 4. As shown in FIG. 4, the cross pressure difference becomes larger as the flow rate of the exhaust gas becomes larger and the amount of the collected amount of the exhaust particles becomes larger. Therefore, the collected amount of the exhaust particles can be computed based on the cross pressure difference and the flow rate of the exhaust gas.

As shown in FIG. 1, an air flow meter 54 is provided in the intake passage 2 to sense a mass flow rate of intake air (hereinafter referred as an intake air amount). An accelerator pedal position sensor 55 is provided to an accelerator pedal (not shown) to sense a depressing amount (a pedal position) of the accelerator pedal. The internal combustion engine 1 includes a crank angle sensor 56 for sensing a crank angle position of the internal combustion engine 1.

Outputs from the above various sensors and the air flow meter are inputted to an electronic control unit (ECU) 6. The ECU 6 includes a known microcomputer, which has a CPU, a ROM, and a RAM, and executes various programs stored in the microcomputer in turn. The CPU, the ROM and the RAM are not illustrated. Specifically, the ECU 6 executes a fuel injection control program to control fuel injection quantities into the internal combustion engine 1 based on an engine operational state (e.g., an engine rotational speed, the depressing amount of the accelerator pedal). Also, the ECU 6 executes a collector regeneration control program to regenerate the collector 4 at predetermined timing.

Then, operations of the exhaust gas purifying apparatus according to the present embodiment will be described.

As shown in FIG. 4, in the present embodiment, the collected amount of the exhaust particles in the collector 4 is estimated by changing over using a pressure-difference-based estimation method and an operational-state-based (operational-history-based) estimation method in relation to the operational state of the internal combustion engine 1. Here, in the pressure-difference-based estimation method, the collected amount is estimated mainly based on the cross pressure difference across the collector 4. In the operational-state-based estimation method, the collected amount is estimated by integrating an increase of the collected amount (an operational-state-based increase of the collected amount). Here, the increase is computed based on a discharge amount of the exhaust particles from the internal combustion engine 1. In FIG. 4, t1 indicates timing for switching the pressure-difference-based estimation method to the operational-state-based estimation method, and t2 indicates timing for switching the operational-state-based estimation method to the pressure-difference-based estimation method.

Figure 3:
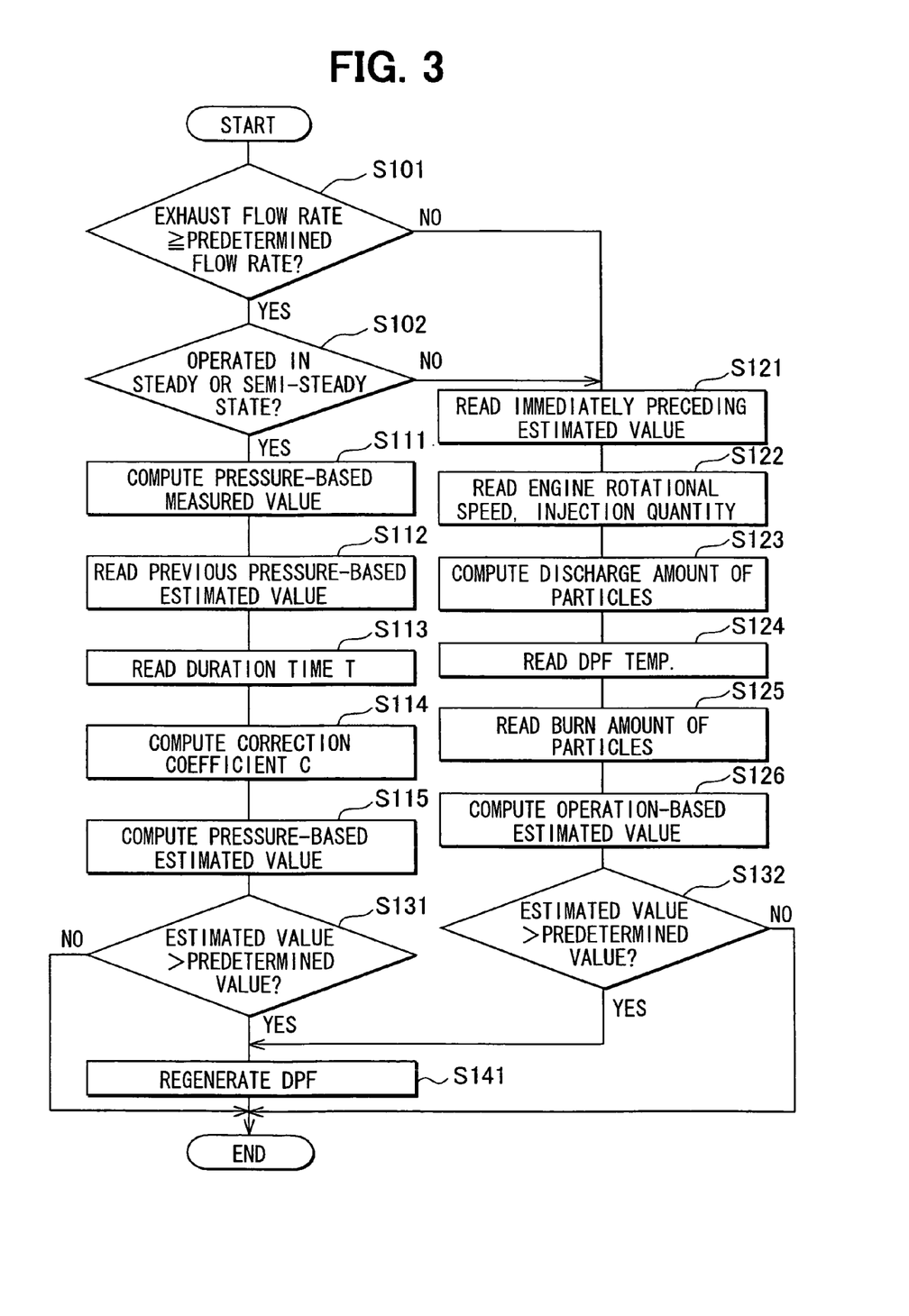
FIG. 3 is a flowchart showing a collector regeneration control program, which is executed by an electronic control unit (ECU) shown in FIG. 1.

The collector regeneration control program shown in FIG. 3 is repeated and executed, for example, in a predetermined period. As shown in FIG. 3, an estimation method for estimating the collected amount is selected at steps S101, S102. In other words, when the flow rate of the exhaust gas that passes through the collector 4 is equal to or more than a predetermined flow rate (YES at step S101) and the internal combustion engine 1 is operated in a steady operational state or in a semi-steady operational state (YES at step S102), the collected amount is estimated by using the pressure-difference-based estimation method in steps S111 to S115. Here, a predetermined operational condition according to the present invention corresponds to determinations in both step S101 and step S102. Also, steps S111 to S115 correspond to a pressure-difference-based computing means of the present invention.

In contrast, when the flow rate of the exhaust gas that passes through the collector 4 is less than a predetermined flow rate (NO at step S101), or when the internal combustion engine 1 is operated in a transient operational state (NO at step S102), the collected amount is estimated by using the operational-state-based estimation method in steps S121 to S126. Also, steps S121 to S126 correspond to a operational-state-based computing means of the present invention.

The flow rate of the exhaust gas, the flow rate being used in the determination in step S101, is computed by converting the mass flow rate, which is indicative of the intake air amount, into a volume flow rate based on the DPF inlet temperature, the DPF outlet temperature and the cross pressure difference. Also in step S102, when a change of the flow rate of the exhaust gas per unit time and a change of the cross pressure difference per unit time are both small, the internal combustion engine 1 is determined to be operated in the steady operational condition or the semi-steady operational condition.

When the collected amount is estimated by using the pressure-difference-based estimation method, firstly, a collected amount is computed based on a present value of the flow rate of the exhaust gas and a present value of the cross pressure difference. Hereinafter, the collected amount, which is computed based on the exhaust gas flow rate and the cross pressure difference, is referred as a pressure-difference-based measured value (Mact) of the collected amount. Also, a currently computed value (computed based on the above present values) is referred as a current pressure-difference-based measured value (Mact(i)) of the collected amount. A map indicative of the cross pressure difference relative to the flow rate of the exhaust and the collected amount (see FIG. 2) is stored in the ROM of the ECU 6. The pressure-difference-based measured value Mact is computed based on the map. Data that is required for mapping is obtained through experiments and the like.

Figure 5:
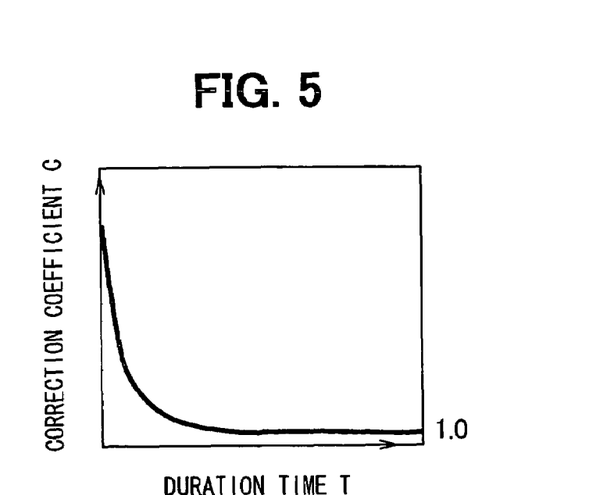
FIG. 5 is a diagram showing a relationship between a duration time T of an estimation period of an operational-state-based estimation method and a correction coefficient C.

Next, a previous pressure-difference-based estimated value of the collected amount, the estimated value being stored in the RAM of the ECU 6, is read at step S122. The previous pressure-difference-based estimated value will be described in detail later. At step S113, a duration time T (see FIG. 4) of an immediately preceding estimation period (immediately preceding operational-state-based computing period) of the operational-state-based estimation method is read. At step S114, a correction coefficient C is computed based on the duration time T. The duration time T is measured by an internal timer of the ECU 6 and is stored in the RAM of the ECU 6. Also, a map for defining a relation between the duration time T and the correction coefficient C is stored in the ROM of the ECU 6, and the correction coefficient C is computed based on the map. Data that is required for mapping is obtained through experiments and the like. FIG. 5 shows the relation between the duration time T and the correction coefficient C. When the duration time T becomes larger, the correction coefficient C becomes smaller. Thus, when the duration time T becomes larger, a pressure-difference-based corrected increase ΔMcor of the collected amount becomes larger. This will be described in detail later. In the present embodiment, the C becomes equal to 1 when the duration time T becomes equal to or larger than a predetermined time (e.g., 10 seconds). Here, the duration time T corresponds to the information related to the immediately preceding operational-state-based computing period.

Then, at step S115, the pressure-difference-based estimated value of the collected amount is calculated by use of the below equation (1). A current pressure-difference-based estimated value of the collected amount, which is calculated at this step, is depicted as M(i) and a previous pressure-difference-based estimated value of the collected amount is depicted as M(i−1).

$$M(i)=M(i-1)+[Mact(i)-M(i-1)]/C \quad \text{equation (1)}$$

In the equation (1), Mact(i)−M(i−1) is an estimated value of an increase of the collected amount, and is hereinafter described as a pressure-difference-based increase ΔM of the collected amount. Also, [Mact(i)−M(i−1)]/C is a corrected value of the pressure-difference-based increase ΔM in accordance with the duration time T, and is hereinafter described as the pressure-difference-based corrected increase ΔMcor of the collected amount.

FIG. 4 shows a case where the pressure-difference-based estimated value M(i) of the collected amount is computed at the switch timing t2. In this case, the pressure-difference-based estimated value of the collected amount at the switch timing t1 serves as the previous pressure-difference-based estimated value M(i−1). Then, the pressure-difference-based corrected increase ΔMcor is added to the previous pressure-difference-based estimated value M(i−1) to compute the current pressure-difference-based estimated value M(i). Here, t2 indicates timing where the estimation method is changed from the operational-state-based estimation method to the pressure-difference-based estimation method, and t1 indicates timing where the estimation method is changed from the pressure-difference-based estimation method to the operational-state-based estimation method. Also, when the collected amount is estimated the second time around or more after the estimation method has been changed to the pressure-difference-based estimation method, the pressure-difference-based estimated value is computed by use of the equation (1). In this case, "the previous pressure-difference-based estimated value M(i−1)" corresponds to an immediately preceding estimated value, which is estimated by use of the pressure-difference-based estimation method after the estimation method has been changed to the pressure-difference-based estimation method. Also, the correction coefficient C is constant.

The pressure-difference-based corrected increase ΔMcor becomes smaller than the pressure-difference-based increase ΔM due to the equation (1). Because of this correction process, a difference between an actual collected amount and the pressure-difference-based estimated value M(i) of the collected amount becomes smaller even in, for example, the semi-steady operational state where a deviation of the pressure-difference-based measured value Mact(i) tends to become larger. Thus, the degree of accuracy in estimating the collected amount is improved. Here, the correction process corrects the current pressure-difference-based estimated value such that the current pressure-difference-based estimated value ranges from the pressure-difference-based measured value to the previous pressure-difference-based estimated value.

Also, when the duration time T of the immediately preceding estimation period of the operational-state-based estimation method is large, a change of the collected amount during the period tends to be large. In this case, if the pressure-difference-based corrected increase ΔMcor is too small, the difference between the actual collected amount and the pressure-difference-based estimated value M(i) may become larger. Thus, the degree of accuracy in the estimation may be severely degraded. However, in the present embodiment, the pressure-difference-based corrected increase ΔMcor is limited from becoming too small when the duration time T is large. Thus, the degree of accuracy in the estimation is improved. Specially, in the present embodiment, C becomes equal to 1 when the duration time T becomes equal to or larger than the predetermined time. Thus, the pressure-difference-based increase ΔM is actually not corrected.

Then at step S131, it is determined whether the pressure-difference-based estimated value M(i) computed at step S115 exceeds a predetermined value. When the answer to step S131 is YES, the collector 4 is regenerated by a well-known method at step S141.

In contrast, when the answer to step S101 or step S102 is NO and the collected amount is estimated by use of the operational-state-based estimation method, an immediately preceding estimated value of the collected amount stored in the RAM of the ECU 6 is read at step S121. Here, when the first collected amount is to be estimated after the estimation method has been changed to the operational-state-based estimation method, the above immediately preceding estimated value of the collected amount corresponds to a final computed value in the estimation period of the pressure-difference-based estimation method that precedes the operational-state-based estimation method. Also, when the collected amount is to be estimated the second time around or more after the estimation method has been changed to the operational-state-based estimation method, "the immediately preceding estimated value of the collected amount" corresponds to an immediately preceding estimated value, which is estimated by use of the operational-state-based estimation method.

Then, at step S122, an engine rotational speed and a fuel injection quantity are read. At step S123, the exhaust amount of the exhaust particles from the internal combustion engine 1 is computed based on the engine rotational speed and the fuel injection quantity read at step S122. The engine rotational speed is computed based on a signal from the crank angle sensor 56. The ROM of the ECU 6 stores a map that defines the exhaust amount of the exhaust particles in relation to the engine rotational speed and the fuel injection quantity. Thus, the exhaust amount of the exhaust particles is computed based on the map. Data that is required for mapping is obtained through experiments and the like.

Then, at step S124, a temperature of the collector 4 is read based on signals supplied form the first and second temperature sensors 51, 52. At step S125, a burning rate of the exhaust particles is computed based on the above read temperature of the collector 4. A burn amount of the exhaust particles is computed base on the computed burning rate. The ROM of the ECU 6 stores a map that defines a relation between the temperature of the collector 4 and the burn rate of the exhaust particles. The burn rate of the exhaust particles is computed by use of the map. Data that is required for mapping is obtained through experiments and the like.

At step S126, the operational-state-based estimated value of the collected amount is computed. Specifically, the burn amount computed at step S125 is subtracted from the exhausted amount computed at step S123 to compute the increase of the collected amount (the operational-state-based increase of the collected amount). As step S121, the increase of the collected amount is added to the immediately preceding estimated value read at step S121 to compute the operational-state-based estimated value of the collected amount.

Then, at step S132, it is determined whether the operational-state-based estimated value computed at step S126 exceeds the predetermined value. When the answer to step S132 is YES, the collector 4 is regenerated by the well-known method at step S141. Here, the predetermined value at step S131 is identical to that at step S132.

As discussed above, in the present embodiment, the pressure-difference-based corrected increase ΔMcor becomes smaller than the pressure-difference-based increase ΔM. Because of the correction process, the difference between the actual collected amount and the pressure-difference-based estimated value M(i) becomes smaller even in, for example, the semi-steady operational state where the deviation of the pressure-difference-based measured value Mact(i) tends to become larger. Thus, the degree of accuracy in estimating the collected amount is improved.

Also, the pressure-difference-based corrected increase ΔMcor is limited from becoming too small when the duration time T of the immediately preceding estimation period of the operational-state-based estimation method is large. Thus, the degree of accuracy in the estimation is improved.

Second Embodiment

Figure 6:
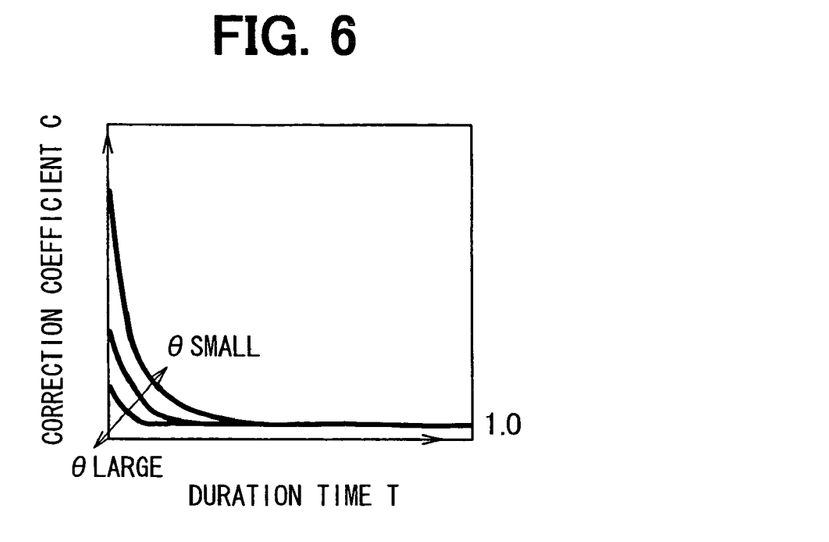
FIG. 6 is a diagram showing the correction coefficient C in relation to the duration time T of the estimation period of the operational-state-based estimation method and a change rate θ of the collected amount in an exhaust gas purifying apparatus for the internal combustion engine according to a second embodiment of the present invention.

A second embodiment of the present invention will be described with accompanying drawings. In the first embodiment, the correction coefficient C is determined based on the duration time T of the immediately preceding estimation period of the operational-state-based estimation method. Here, the immediately preceding estimation period immediately precedes the estimation period of the pressure-difference-based estimation method. However, the correction coefficient C may be alternatively determined based on the duration time T of the immediately preceding estimation period of the operational-state-based estimation method and based on a change rate θ (see FIG. 4) of the collected amount during the duration time T. The change rate θ of the collected amount indicates an average value (unit: g/second) of the increase of the collected amount per unit time during the immediately preceding estimation period of the operational-state-based estimation method. The change rage θ of the collected amount corresponds to the information related to the immediately preceding operational-state-based computing period As shown in FIG. 6, when the duration time T becomes longer or the change rate θ becomes larger, the correction coefficient C becomes smaller. Thus, the pressure-difference-based corrected increase ΔMcor becomes larger. The C becomes equal to 1 when the duration time T becomes equal to or larger than the predetermined time (e.g., 10 seconds).

When the change rate θ is large, the increase of the collected amount during the estimation period of the preceding operational-state-based estimation method becomes large, the estimation period immediately preceding the estimation period of the pressure-difference-based estimation method. In this case, if the pressure-difference-based increase is too small, the difference between the actual collected amount and the pressure-difference-based estimated value may become larger. Thus, the degree of accuracy in the estimation may be severely degraded. However, in the present embodiment, the pressure-difference-based corrected increase ΔMcor is limited from becoming too small when the change rate θ is large. Thus, the degree of accuracy in the estimation is improved.

Third Embodiment

Figure 7:
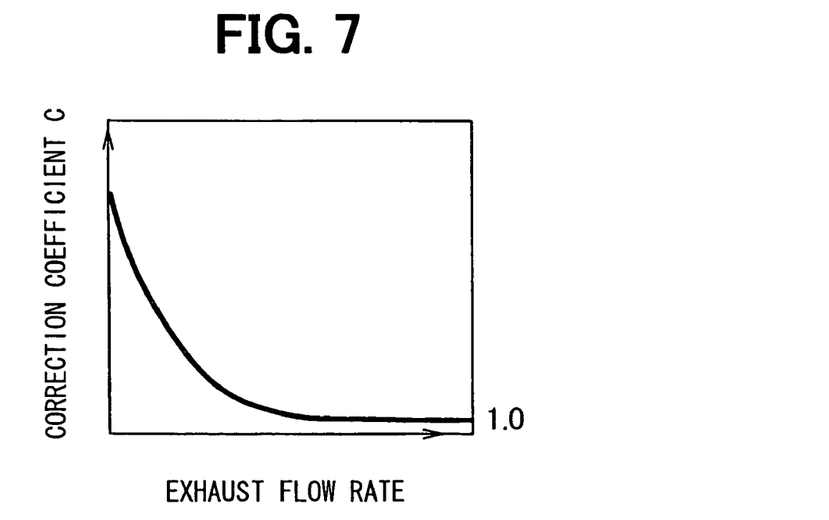
FIG. 7 is a diagram showing a relation between the flow rate of the exhaust gas and the correction coefficient C in an exhaust gas purifying apparatus for the internal combustion engine according to a third embodiment of the present invention.

A third embodiment of the present invention will be described with accompanying drawings. In the first embodiment, the correction coefficient C is determined based on the duration time T of the immediately preceding estimation period of the operational-state-based estimation method. Here, the immediately preceding estimation period immediately precedes the estimation period, where the pressure-difference-based estimation method is used for estimation. However, the correction coefficient C may be alternatively determined based on a flow rate of the exhaust gas that passes through the collector 4. Specifically, as shown in FIG. 7, the correction coefficient C becomes smaller when the flow rate of the exhaust gas becomes larger. Thus, the pressure-difference-based corrected increase ΔMcor becomes larger. When the flow rate of the exhaust gas exceeds a predetermined value, the C becomes equal to 1.

When the flow rate of the exhaust gas is large, the pressure-difference-based corrected increase ΔMcor is set larger. Thus, the pressure-difference-based estimated value can be quickly set closer to the actual collected amount immediately after the estimation method has been changed from the operational-state based estimation method to the pressure-difference-based estimation method.

Other embodiments will be described. In the above first embodiment, the correction coefficient C becomes smaller and thus the pressure-difference-based corrected increase ΔMcor becomes larger when the duration time T becomes larger. However, the correction coefficient C becomes smaller and thus the pressure-difference-based corrected increase ΔMcor becomes larger alternatively when a travel distance of the vehicle during the immediately preceding estimation period of the operational-state-based estimation method is larger. Here, the travel distance of the vehicle corresponds to the information related to the immediately preceding operational-state-based computing period.

Also, the correction coefficient C may be alternatively determined based on the duration time T of the immediately preceding estimation period of the operational-state-based estimation method and based on the flow rate of the exhaust gas that passes through the collector 4. Here, the immediately preceding estimation period immediately precedes the estimation period of the pressure-difference-based estimation method. In this case, the correction coefficient C becomes smaller and thus the pressure-difference-based corrected increase ΔMcor becomes larger when the duration time T becomes larger or the flow rate becomes larger.

Furthermore, the correction coefficient may be alternatively determined based on the duration time T, the change rate θ of the collected amount in the duration time T, and the flow rate of the exhaust gas. In this case, the correction coefficient C becomes smaller and thus the pressure-difference-based corrected increase ΔMcor becomes larger when the duration time T becomes larger, the change rate θ becomes larger, or the flow rate becomes larger.

Additional advantages and modifications will readily occur to those skilled in the art. The invention in its broader terms is therefore not limited to the specific details, representative apparatus, and illustrative examples shown and described.

What is claimed is:

1. An exhaust gas purifying apparatus for an internal combustion engine, which is mounted on a vehicle, comprising:
   a collector that collects exhaust particles in exhaust gas discharged from the internal combustion engine;
   a pressure-difference-based computing means for computing a pressure-difference-based measured value of a collected amount of the exhaust particles in the collector based on a pressure difference across the collector, wherein the pressure-difference-based computing means includes a correcting means for computing a pressure-difference-based estimated value of the collected amount by correcting the pressure-difference-based measured value of the collected amount; and
   an operational-state-based computing means for computing an operational-state-based increase of the collected amount of the exhaust particles in the collector based on an operational state of the internal combustion engine, and for computing an operational-state-based estimated value of the collected amount by adding the operational-state-based increase of the collected amount to the pressure-difference-based estimated value of the collected amount computed latest by the pressure-difference-based computing means, wherein:
   the exhaust gas purifying apparatus switches the pressure-difference-based computing means and the operational-state-based computing means based on a predetermined operational condition; and
   the exhaust gas purifying apparatus regenerates the collector by burning the exhaust particles collected in the collector when one of the pressure-difference-based estimated value of the collected amount and the operational-state-based estimated value of the collected amount reaches a predetermined value; and
   the correcting means computes a current pressure-difference-based estimated value by correcting a current pressure-difference-based measured value of the collected amount based on information related to an immediately preceding operational-state-based computing period, where the operational-state-based computing means computes the collected amount, such that the current pressure-difference-based estimated value ranges from the current pressure-difference-based measured value to a previous pressure-difference-based estimated value, which is computed previously of the current pressure-difference-based estimated value.

2. The exhaust gas purifying apparatus according to claim 1, wherein the information related to the immediately preceding operational-state-based computing period includes one of the following:
   a duration time of the immediately preceding operational-state-based computing period; and
   a travel distance of the vehicle during the immediately preceding operational-state-based computing period.

3. The exhaust gas purifying apparatus according to claim 2, wherein one of the information related to the immediately preceding operational-state-based computing period includes the operational-state-based increase of the collected amount per unit time during the immediately preceding operational-state-based computing period.

4. The exhaust gas purifying apparatus according to claim 3, wherein:
   a pressure-difference-based increase of the collected amount is computed by subtracting the previous pressure-difference-based estimated value from the current pressure-difference-based measured value;
   the pressure-difference-based computing means corrects the pressure-difference-based increase such that the pressure-difference-based increase is reduced;
   the pressure-difference-based computing means computes a pressure-difference-based corrected increase by changing a correction degree for correcting the pressure-difference-based increase based on the information related to the immediately preceding operational-state-based computing period; and
   the pressure-difference-based computing means computes the current pressure-difference-based estimated value by adding the pressure-difference-based corrected increase to the previous pressure-difference-based estimated value.

5. The exhaust gas purifying apparatus according to claim 4, wherein the pressure-difference-based computing means computes the pressure-difference-based corrected increase such that the pressure-difference-based corrected increase is set larger correspondingly when the duration time of the immediately preceding operational-state-based computing period is longer, or when the travel distance of the vehicle during the immediately preceding operational-state-based computing period is longer.

6. The exhaust gas purifying apparatus according to claim 5, wherein the pressure-difference-based computing means computes the pressure-difference-based corrected increase such that the pressure-difference-based corrected increase is set larger correspondingly when the operational-state-based increase of the collected amount per unit time during the immediately preceding operational-state-based computing period is larger.

7. The exhaust gas purifying apparatus according to claim 1, wherein the pressure-difference-based computing means computes the pressure-difference-based measured value based on the pressure difference across the collector and a flow rate of the exhaust gas that passes through the collector.

8. The exhaust gas purifying apparatus according to claim 1, wherein the operational-state-based computing means computes the operational-state-based increase of the collected amount based on a discharge amount of the exhaust particles and a burn amount of the exhaust particles in the collector.

9. The exhaust gas purifying apparatus according to claim 1, wherein:
   the correcting means computes the current pressure-difference-based estimated value by correcting the current pressure-difference-based measured value of the collected amount based on the information related to the immediately preceding operational-state-based computing period and based on the previous pressure-difference-based estimated value.

10. An exhaust gas purifying apparatus for an internal combustion engine, which is mounted on a vehicle, comprising:
    a collector that collects exhaust particles in exhaust gas discharged from the internal combustion engine;
    a pressure-difference-based computing means for computing a pressure-difference-based measured value of a collected amount of the exhaust particles in the collector based on a pressure difference across the collector, and for computing a pressure-difference-based estimated value of the collected amount by correcting the pressure-difference-based measured value of the collected amount; and
    an operational-state-based computing means for computing an operational-state-based increase of the collected amount of the exhaust particles in the collector based on an operational state of the internal combustion engine, and for computing an operational-state-based estimated value of the collected amount by adding the operational-state-based increase of the collected amount to the pressure-difference-based estimated value of the collected amount computed latest by the pressure-difference-based computing means, wherein:

the exhaust gas purifying apparatus switches the pressure-difference-based computing means and the operational-state-based computing means based on a predetermined operational condition;

the exhaust gas purifying apparatus regenerates the collector by burning the exhaust particles collected in the collector when one of the pressure-difference-based estimated value of the collected amount and the operational-state-based estimated value of the collected amount reaches a predetermined value; and the pressure-difference-based computing means computes a current pressure-difference-based estimated value by correcting a current pressure-difference-based measured value of the collected amount based on a flow rate of the exhaust gas that passes through the collector such that the current pressure-difference-based estimated value ranges from the current pressure-difference-based measured value to a previous pressure-difference-based estimated value, which is computed previously of the current pressure-difference-based estimated value;

a pressure-difference-based increase of the collected amount is computed by subtracting the previous pressure-difference-based estimated value from the current pressure-difference-based measured value;

the pressure-difference-based computing means corrects the pressure-difference-based increase such that the pressure-difference-based increase is reduced;

the pressure-difference-based computing means computes a pressure-difference-based corrected increase by changing a correction degree for correcting the pressure-difference-based increase based on the flow rate of the exhaust gas that passes through the collector; and the pressure-difference-based computing means computes the current pressure-difference-based estimated value by adding the pressure-difference-based corrected increase to the previous pressure-difference-based estimated value.

11. The exhaust gas purifying apparatus according to claim 10, wherein the pressure-difference-based computing means computes the pressure-difference-based corrected increase such that the pressure-difference-based corrected increase is set larger correspondingly when the flow rate of the exhaust gas that passes through the collector is larger.

12. The exhaust gas purifying apparatus according to claim 10, wherein the pressure-difference-based computing means computes the pressure-difference-based measured value based on the pressure difference across the collector and the flow rate of the exhaust gas that passes through the collector.

13. The exhaust gas purifying apparatus according to claim 10, wherein the operational-state-based computing means computes the operational-state-based increase of the collected amount based on a discharge amount of the exhaust particles and a bum amount of the exhaust particles in the collector.

14. The exhaust gas purifying apparatus according to claim 10, wherein:

the pressure-difference-based computing means includes a correcting means that computes the current pressure-difference-based estimated value by correcting the current pressure-difference-based measured value of the collected amount based on the information related to the immediately preceding operational-state-based computing period and based on the previous pressure-difference-based estimated value.

15. An exhaust gas purifying apparatus for an internal combustion engine, which is mounted on a vehicle, comprising:

a collector that collects exhaust particles in exhaust gas discharged from the internal combustion engine;

a pressure-difference-based computing means for computing a pressure-difference-based measured value of a collected amount of the exhaust particles in the collector based on a pressure difference across the collector, and for computing a pressure-difference-based estimated value of the collected amount by correcting the pressure-difference-based measured value of the collected amount; and an operational-state-based computing means for computing an operational-state-based increase of the collected amount of the exhaust particles in the collector based on an operational state of the internal combustion engine, and for computing an operational-state-based estimated value of the collected amount by adding the operational-state-based increase of the collected amount to the pressure-difference-based estimated value of the collected amount computed latest by the pressure-difference-based computing means, wherein:

the exhaust gas purifying apparatus switches the pressure-difference-based computing means and the operational-state-based computing means based on a predetermined operational condition;

the exhaust gas purifying apparatus regenerates the collector by burning the exhaust particles collected in the collector when one of the pressure-difference-based estimated value of the collected amount and the operational-state-based estimated value of the collected amount reaches a predetermined value;

the pressure-difference-based computing means computes a current pressure-difference-based estimated value by correcting a current pressure-difference-based measured value of the collected amount based on information related to an immediately preceding operational-state-based computing period, where the operational-state-based computing means computes the collected amount, such that the current pressure-difference-based estimated value ranges from the current pressure-difference-based measured value to a previous pressure-difference-based estimated value, which is computed previously of the current pressure-difference-based estimated value;

the information related to the immediately preceding operational-state-based computing period includes one of the following: a duration time of the immediately preceding operational-state-based computing period; and a travel distance of the vehicle during the immediately preceding operational-state-based computing period;

one of the information related to the immediately preceding operational-state-based computing period includes the operational-state-based increase of the collected amount per unit time during the immediately preceding operational-state-based computing period;

a pressure-difference-based increase of the collected amount is computed by subtracting the previous pressure-difference-based estimated value from the current pressure-difference-based measured value; the pressure-difference-based computing means corrects the pressure-difference-based increase such that the pressure-difference-based increase is reduced;

the pressure-difference-based computing means computes a pressure-difference-based corrected increase by changing a correction degree for correcting the pressure-difference-based increase based on the information related to the immediately preceding operational-state-based computing period; and the pressure-difference-based computing means computes the current pressure-difference-based estimated value by adding the pressure-difference-based corrected increase to the previous pressure-difference-based estimated value.

* * * * *